United States Patent
Winzer

(10) Patent No.: US 7,450,863 B2
(45) Date of Patent: Nov. 11, 2008

(54) OPTICAL RECEIVER FOR WAVELENGTH-DIVISION-MULTIPLEXED SIGNALS

(75) Inventor: Peter J. Winzer, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 873 days.

(21) Appl. No.: 10/464,318

(22) Filed: Jun. 18, 2003

(65) Prior Publication Data

US 2004/0258423 A1 Dec. 23, 2004

(51) Int. Cl.
*H04B 10/06* (2006.01)

(52) U.S. Cl. .................. 398/204; 398/202; 398/203

(58) Field of Classification Search .......... 398/204, 398/205, 206, 202, 203, 79; 359/325
See application file for complete search history.

(56) References Cited

U.S. PATENT DOCUMENTS

| | | | | |
|---|---|---|---|---|
| 5,907,421 | A * | 5/1999 | Warren et al. ............... | 398/188 |
| 6,826,371 | B1 * | 11/2004 | Bauch et al. ................ | 398/188 |
| 6,911,645 | B2 * | 6/2005 | Beger et al. ............ | 250/227.19 |
| 7,113,702 | B2 * | 9/2006 | Yamada et al. ................ | 398/79 |
| 7,200,338 | B2 * | 4/2007 | Onaka ........................ | 398/155 |
| 2002/0131127 | A1 * | 9/2002 | Myers ........................ | 359/161 |
| 2003/0007216 | A1 * | 1/2003 | Chraplyvy et al. .......... | 359/161 |
| 2003/0058504 | A1 | 3/2003 | Cho et al. .................... | 359/161 |
| 2003/0090768 | A1 * | 5/2003 | Liu et al. ..................... | 359/183 |
| 2003/0170028 | A1 * | 9/2003 | Mori et al. ..................... | 398/79 |
| 2004/0047633 | A1 * | 3/2004 | Hoshida et al. ............. | 398/102 |
| 2004/0208647 | A1 * | 10/2004 | Gill et al. ..................... | 398/188 |
| 2004/0218932 | A1 | 11/2004 | Epworth et al. ............. | 398/202 |
| 2006/0056845 | A1 * | 3/2006 | Parsons et al. ................ | 398/41 |
| 2006/0132789 | A1 * | 6/2006 | Davidson et al. ............ | 356/477 |
| 2006/0140636 | A1 * | 6/2006 | Marazzi et al. ............. | 398/147 |

OTHER PUBLICATIONS

"S-band 3×120-km DSF transmission of 8×42.7-Gbit/s DWDM duobinary-carrier-suppressed RZ signals generated by novel wideband PM/AM conversion," by Yutaka Miyamoto, et al; *NTT Network Innovation Laboratories, NTT Corporation*, pp. PD6-1 through PD 6-3.

\* cited by examiner

*Primary Examiner*—Kenneth Vanderpuye
*Assistant Examiner*—Thi Le

(57) ABSTRACT

A WDM receiver that includes a single, delay interferometer coupled to an N-channel wavelength-demultiplexing filter provides for the simultaneous conversion of a multiplex of N differential-phase-shift-keyed modulated optical signals of different wavelengths into N intensity-modulated optical signal channels. The N intensity-modulated optical signals may be individually detected by a bank of N photodiode circuits to recover the modulated data stream or used for optical amplification, regeneration, processing, control, or modulation.

16 Claims, 3 Drawing Sheets

OPTICAL RECEIVER FOR WAVELENGTH-DIVISION-MULTIPLEXED SIGNALS

BACKGROUND OF THE INVENTION

1. Field of the Invention

This invention relates generally to the field of optical telecommunications, and in particular, to optically demodulating differential-phase-shift-keyed (DPSK) signals in a wavelength-division-multiplexed (WDM) communication environment.

2. Description of the Related Art

In state-of-the-art, wavelength-division-multiplexed optical communication systems, multiple, individually modulated wavelengths of light are multiplexed into a single fiber and routed to a remote receiving location. At the receiving location, it is common to separate the WDM channels using an optical wavelength-demultiplexing filter in order to route each channel to its own, dedicated demodulator.

In a system that employs differential-phase-shift-keyed modulation, a dedicated DPSK demodulator is used within the receivers of each WDM channel. A DPSK demodulator may be implemented using an optical delay interferometer (DI) (e.g., a Mach-Zehnder interferometer) followed by an optical-to-electrical (O-E) converter. The function of the DI is to convert a phase-coded optical signal into an intensity-modulated signal before the signal is presented to the O-E converter. The function of the O-E is to convert the resulting optical intensity modulation to an electrical current or voltage that may be further processed in the electrical domain.

The DI operates by splitting the DPSK input signal into two components and delaying one component with respect to the other by a time delay $T_d$, where the time delay is usually set to be an integer multiple of the bit duration T. In most cases, but not exclusively, the delay $T_d$ is chosen to equal the bit duration T of the modulated bit stream. The two relatively delayed components of the phase-coded input signal are then combined at an output coupler of the DI. The relative optical phase difference between the two signals within the DI is set to produce, in the absence of phase changes, constructive interference at one of the DI output ports and destructive interference at the other. When single-ended detection is employed by the demodulator, only one output is brought out of the DI to an O-E converter that is typically implemented using a photodiode and associated circuitry. When balanced detection is employed by the demodulator, both outputs are brought out of the DI to two such O-E converters.

In a single-ended implementation, a single output port of the DI is coupled to a single photodiode detector and circuitry to translate the optical intensity out of the DI into a recovered bit stream.

In a balanced implementation, each of two ports out of the DI is coupled to its own photodiode, and the difference between the electrical outputs of the photodiode circuits are used to recover the bit stream.

For a DPSK-modulated WDM system of N channels, it is typical to employ an N-channel optical wavelength-demultiplexing filter, followed by N dedicated DPSK demodulators, one for each receiver.

SUMMARY OF THE INVENTION

Problems in the prior art are addressed in accordance with principles of the present invention by employing a single delay interferometer (e.g., a Mach-Zehnder interferometer) to simultaneously convert a multiplex of N DPSK-modulated optical signals of different wavelengths into two versions of a multiplex of N intensity-modulated optical signals. Each version is next separated into N individual channels by an N-channel wavelength-demultiplexing filter, and each channel is then individually detected by one of a bank of N photodiode circuits.

In one embodiment, the present invention is a receiver for an optical input signal. The receiver includes a delay interferometer (DI) adapted to receive the optical input signal, and a first wavelength-demultiplexing filter (WDF), wherein a first output of the DI is coupled to an input of the first WDF.

In another embodiment, the present invention is a receiver for an optical input signal. In this embodiment, the optical input signal is a multiplex of N modulated signals corresponding to different wavelengths and the receiver includes (i) a first component adapted to convert the optical input signal into one or more versions of a multiplex of N intensity-modulated optical signals and (ii) a second component adapted to separate a first version of the multiplex of N intensity-modulated optical signals into N different optical channel signals.

In yet another embodiment, the present invention is a method for processing an optical input signal where the optical input signal is a multiplex of N modulated signals corresponding to N different wavelengths and the method involves (a) converting the optical input signal into one or more versions of a multiplex of N intensity-modulated optical signals, and (b) separating a first version of the multiplex of N intensity-modulated optical signals into N different optical channel signals.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Demultiplexer-Demodulator

Figure 1:
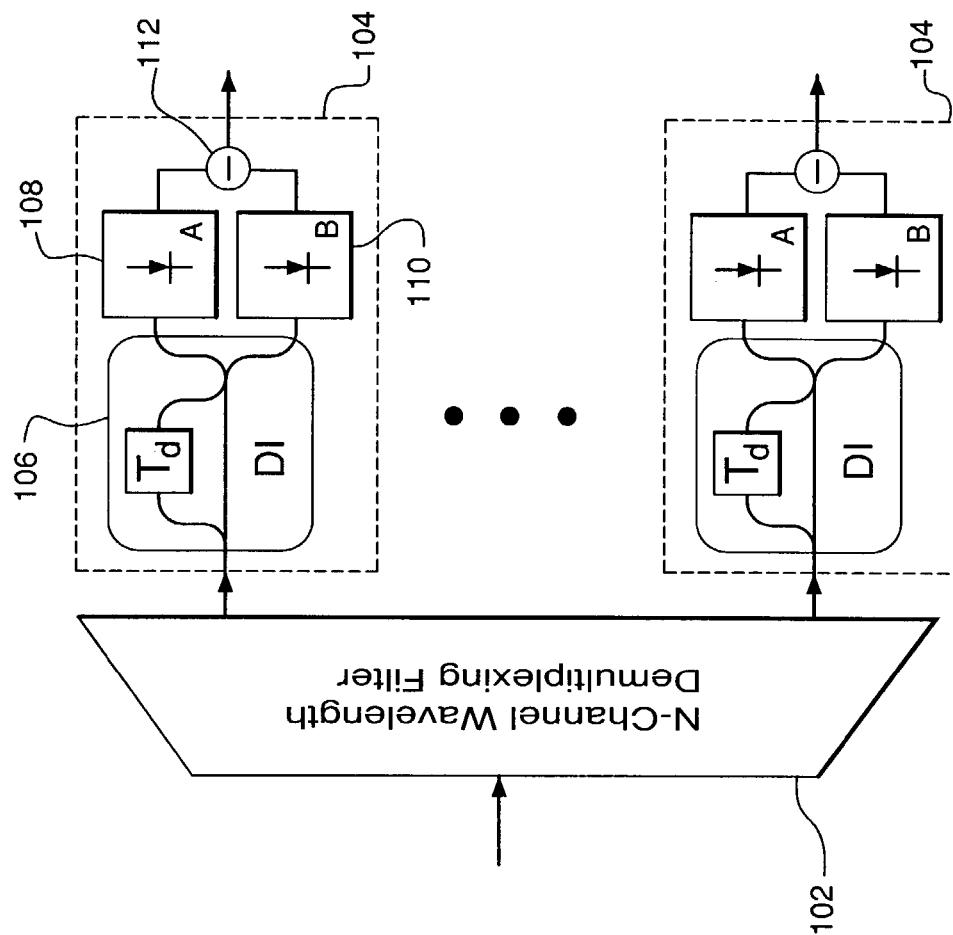
FIG. 1 depicts N-channel WDM receiver 100 according to the prior art.

FIG. 1 depicts N-channel differential-phase-shift-keyed WDM receiver 100 according to the prior art. As shown, receiver 100 includes an N-channel optical wavelength-demultiplexing filter 102 feeding N DPSK demodulators 104. Each demodulator includes dual-output delay interferometer (e.g., a Mach-Zehnder interferometer) 106 followed by first and second photodiode circuits, 108 and 110, respectively, and differencing circuit 112.

In operation, a multiplex of independently DPSK-modulated wavelengths of light are fed to the input of N-channel optical wavelength-demultiplexing filter 102. The filter separates the multiplex into N channels and routes each channel to its own, dedicated demodulator 104.

Each demodulator 104 includes dual-output delay interferometer (DI) 106, which converts the DPSK-modulated channel signal into two intensity-modulated output signals that are logically inverted copies of each other. Each of the two DI outputs is fed to a photodiode circuit (e.g., implemented using InGaAs photodiodes and supporting circuitry), where the DI output is converted from an optical signal into an electrical signal. The two electrical signals are then forwarded to differencing circuit 112, which outputs the corresponding difference signal from the demodulator.

Demodulator 104 of circuit 100 is an example of a balanced implementation. Alternatively, a single-ended implementation of demodulator 104 might be used, where a single-output DI (or one output of a dual-output DI) is coupled to a single photodiode circuit, and the output of the single photodiode circuit is the output of the demodulator.

Demodulator-Demultiplexer

Figure 2:
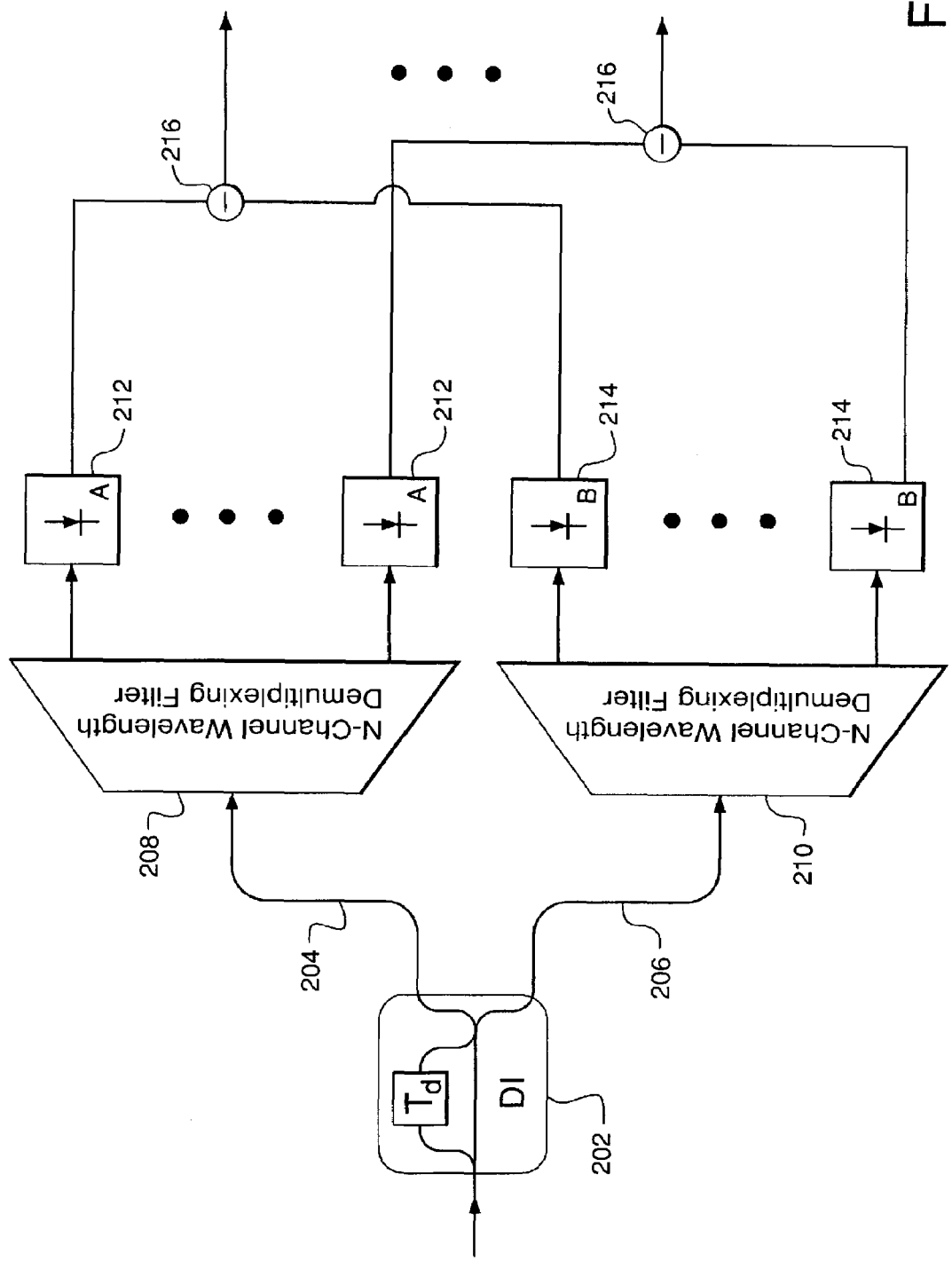
FIG. 2 depicts receiver 200 for an N-channel DPSK WDM optical communication system according to one embodiment of present invention.

FIG. 2 depicts receiver 200 for an N-channel DPSK WDM optical communication system according to one embodiment of present invention.

As illustrated, receiver 200 includes delay interferometer 202, first wavelength-demultiplexing filter 208, second wavelength-demultiplexing filter 210, a first set of photodiode circuits 212, a second set of photodiode circuits 214, and differencing circuits 216.

Note that a DI with a relative path delay of $T_d$ represents a periodic filter with period $$\frac{1}{T_d} = f_d$$

when looked at in the frequency domain. Thus, the demodulating properties of a DI apply equally well to all information-carrying DPSK data signals with a frequency separation of $P \cdot f_d$, where P is an integer quantity. Further, interchanging the output ports of the DI is equivalent to shifting the DI output spectrum by $$\frac{1}{2} f_d.$$

Each DI frequency shift of $\frac{1}{2} f_d$ logically inverts the demodulated data signal. Thus, all optical signal carrier frequencies spaced at integer multiples of $$\frac{1}{2} f_d$$

can be simultaneously demodulated by the same DI.

In embodiments of the present invention, the periodic filtering characteristics of DI 202 are exploited in combination with the DI's ability to perform phase-to-amplitude conversion to realize a massively parallel, N-channel, phase-to-amplitude converter 202.

In contrast to the prior art, which teaches a single demultiplexer followed by multiple phase-to-amplitude converters and multiple amplitude detectors, embodiments of the present invention are directed to a single phase-to-amplitude converter followed by one or two demultiplexers and multiple amplitude detectors.

In the balanced embodiment of the present invention shown in FIG. 2, an N-channel multiplex of DPSK modulated signals that are separated in frequency by integer multiples of $$\frac{1}{2} f_d$$

are fed to DI 202. The DI performs simultaneous phase-to-amplitude conversions on the N channels and outputs versions of the processed multiplex on each of its two output ports 204 and 206. Output port 204 of DI 202 is coupled to first wavelength-demultiplexing filter 208, and output port 206 of DI 202 is coupled to second wavelength-demultiplexing filter 210. Each demultiplexing filter separates its input into N-channels. Next, each channel out of first wavelength-demultiplexing filter 208 is fed to its own photodiode circuit 212, and each channel out of second wavelength-demultiplexing filter 210 is fed to its own photodiode circuit 214. Corresponding channels output from the first and second filters are then fed to differencing circuits 216 to form the balanced output for each channel.

Note that, for embodiments of the present invention that employ balanced detection, each DI output port is connected to a separate wavelength-demultiplexing filter. In this case, the two demultiplexers are not restricted to having the same transfer characteristics. This can prove useful in dense WDM scenarios, where tight channel filtering may seriously degrade the signal quality, if the WDM demultiplexer's filter shape is chosen inappropriately.

Single-Ended Embodiment

Figure 3:
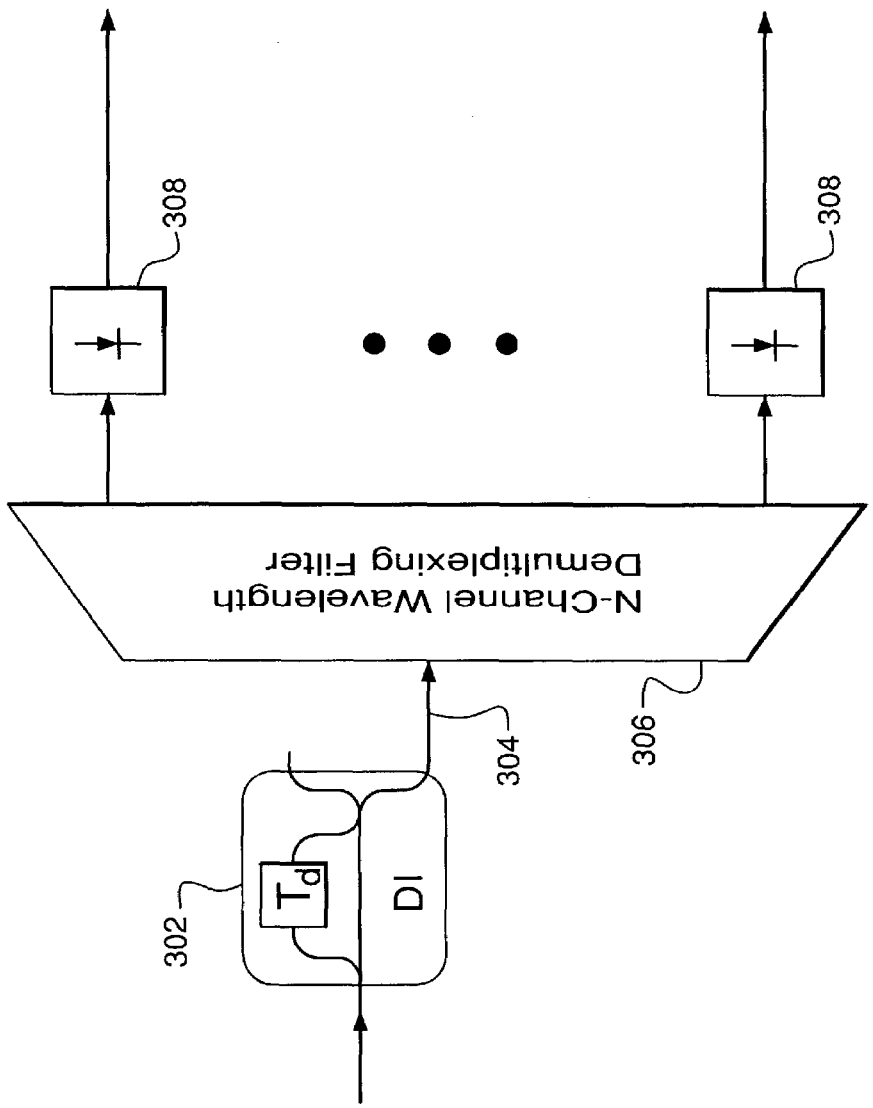
FIG. 3 depicts single-ended receiver 300 for an N-channel DPSK WDM optical communication system according to an alternative embodiment of present invention.

FIG. 3 depicts single-ended receiver 300 for an N-channel DPSK WDM optical communication system according to an alternative embodiment of the present invention. Elements of this embodiment operate similarly to corresponding elements of the embodiment of FIG. 2.

In this single-ended embodiment, an N-channel multiplex of DPSK-modulated signals that are separated in frequency by integer multiples of $$\frac{1}{2} f_d$$

are fed to DI 302. The DI performs simultaneous phase-to-amplitude conversions on the N-channels of the multiplex and presents the processed results on its output ports. Note that only one of the output ports of the DI is used in this embodiment. As shown, output port 304 of DI 302 feeds a single, wavelength-demultiplexing filter 306. The filter separates the multiplex into its individual component channels. Each channel is fed to its own photodiode circuit 308, which converts the optical amplitude signal to an electrical current or voltage.

In certain embodiments of the present invention, receiver 200 or 300 may be combined with an inter-symbol equalization mechanism that adjusts the magnitude and phase of the received WDM multiplex prior to demodulation. Such equalization serves to improve detection performance of the received signal, in particular, by limiting the impact of inter-symbol interference in the WDM transmission. Details on such an equalizer can be found in co-pending U.S. nonprovisional application Ser. No. 10/393,483, "Multi-Channel Optical Equalizer For Intersymbol Interference," filed on Mar. 20, 2003, incorporated herein by reference in its entirety. Although the wavelength-demultiplexing filters illustrated in FIGS. 2 and 3 feed O-E converters in the form of a single or double photodiode circuit (depending on whether it is a single-ended or balanced implementation), it should be understood that alternative methods or devices for O-E conversion may be used. Alternatively, the intensity-modulated light might not be converted to the electrical domain at all and might instead be kept in the optical domain for use in optical amplification, optical regeneration, optical processing, or optical modulation applications, as would be understood to one skilled in the art.

Note that the wavelength-demultiplexing filter and other elements of the present invention may be implemented by various techniques and in various technologies while remaining within the spirit and scope of the invention. These techniques and technologies include, but are not limited to, integrated optics (including silica on silicon substrate or $Si:SiO_2$), fiber optics, free space optics, thin film, InGaAs, InP, micromirror micro-electro-mechanical system (MEMS) arrays, and optical grating subsystems.

Although the receiver of this invention was described in the context of DPSK-modulated data channels, embodiments of the present invention directed to other differential phase modulation schemes (e.g., 8-DPSK and differential quadrature phase shift keyed (DQPSK)) would also be within the principle and scope of the present invention, as would be understood to one skilled in the art.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

I claim:

1. A receiver for an optical input signal, the receiver comprising:
   a delay interferometer (DI) adapted to receive the optical input signal, wherein the optical input signal is a multiplex of N modulated signals separated from each other by integer multiples of $½T_d$, where $T_d$ is a relative path delay of the DI and N is an integer greater than 1;
   a first wavelength-demultiplexing filter (WDF), wherein a first optical output of the DI is coupled to an optical input of the first WDF;
   a second WDF, wherein a second optical output of the DI is coupled to an optical input of the second WDF, wherein:
      each of the first and second WDFs has N outputs; and
      each WDF output is connected to an O-E converter adapted to convert an optical signal from the corresponding WDF into an electrical signal; and
   a plurality of differencing circuits, wherein each differencing circuit is associated with an O-E converter of the first WDF and a corresponding O-E converter of the second WDF, wherein each differencing circuit generates a difference between the electrical signals from the corresponding pair of O-E converters.

2. The invention of claim 1, wherein:
   the DI converts the optical input signal into two or more versions of a multiplex of N intensity-modulated optical signals;
   the first WDF separates a first version of the multiplex of N intensity-modulated optical signals into N respective different optical channel signals; and
   the second WDF separates a second version of the multiplex of N intensity-modulated optical signals into N respective different optical channel signals.

3. The invention of claim 2, wherein the optical input signal comprises N phase-encoded carriers.

4. The invention of claim 3, wherein the optical input signal is a DPSK WDM signal.

5. The invention of claim 1, wherein the optical input signal is a DQPSK or an 8-DPSK WDM signal.

6. The invention of claim 1, wherein the DI is implemented using a Mach-Zehnder interferometer.

7. A receiver for an optical input signal, wherein the optical input signal is a multiplex of N modulated signals separated from each other by integer multiples of $½T_d$, where $T_d$ is a relative path delay of a delay interferometer and N is an integer greater than 1, the receiver comprising:
   a first component adapted to convert the optical input signal into two or more versions of a multiplex of N intensity-modulated optical signals;
   a second component adapted to separate a first version of the multiplex of N intensity-modulated optical signals into N respective different optical channel signals;
   a third component adapted to separate a second version of the multiplex of N intensity-modulated optical signals into N respective different optical channel signals;
   a plurality of O-E converters, wherein each O-E converter is coupled to an output of the second and third components; and
   a plurality of differencing circuits, wherein each differencing circuit is associated with an O-E converter of the second component and a corresponding O-E converter of the third component, wherein each differencing circuit generates a difference between the electrical signals from the corresponding pair of O-E converters.

8. The invention of claim 7, wherein the first component is the delay interferometer (DI) and the second component is a wavelength-demultiplexing filter (WDF).

9. The invention of claim 7, wherein the first component is the delay interferometer (DI) and each of the second and third components is a wavelength-demultiplexing filter (WDF).

10. A method for processing an optical input signal, wherein the optical input signal is a multiplex of N modulated signals separated from each other by integer multiples of $½T_d$, where $T_d$ is a relative path delay of a delay interferometer and N is an integer greater than 1, the method comprising:
   conveying the optical input signal into two or more versions of a multiplex of N intensity-modulated optical signals;
   separating a first version of the multiplex of N intensity-modulated optical signals into N respective different optical channel signals;
   separating a second version of the multiplex of N intensity-modulated optical signals into N respective different optical channel signals;
   conveying each optical channel signal generated in the separating steps into an electrical channel signal; and
   subtracting each electrical channel signal generated by conveying optical channel signals from the first version from a corresponding electrical channel signal generated by conveying optical channel signals from the second version.

11. The invention of claim 10, wherein:
   the step of conveying the optical input signal is implemented using the delay interferometer (DI); and each of the separating steps is implemented using a respective wavelength-demultiplexing filter (WDF).

12. The invention of claim 10, wherein the optical channel signals are used for one or more of optical amplification, optical regeneration, optical processing, and optical modulation.

13. The invention of claim 11, wherein the optical input signal comprises N phase-encoded carriers.

14. The invention of claim 11, wherein each of said respective WDFs has channel spacing of about $½T_d$.

15. The invention of claim 1, wherein each of the first and second WDFs has channel spacing of about $½T_d$.

16. The invention of claim 9, wherein each of said WDFs has channel spacing of about $½T_d$.

* * * * *

UNITED STATES PATENT AND TRADEMARK OFFICE
CERTIFICATE OF CORRECTION

PATENT NO.        : 7,450,863 B2
APPLICATION NO.   : 10/464318
DATED             : November 11, 2008
INVENTOR(S)       : Peter J. Winzer It is certified that error appears in the above-identified patent and that said Letters Patent is hereby corrected as shown below:

In Column 6, on line 49, replace "convening" with --converting--.

In Column 6, on line 58, replace "convening" with --converting--.

In Column 6, on line 61, replace "convening" with --converting--.

In Column 6, on line 63, replace "convening" with --converting--.

In Column 6, on line 66, replace "convening" with --converting--.

Signed and Sealed this

Tenth Day of February, 2009

JOHN DOLL
*Acting Director of the United States Patent and Trademark Office*